United States Patent [19]

Hiramatsu

[11] 4,137,886
[45] Feb. 6, 1979

[54] AIR INTAKE SYSTEM FOR AN INTERNAL COMBUSTION ENGINE

[75] Inventor: Iwao Hiramatsu, Omiya, Japan

[73] Assignee: Nissan Diesel Motor Company, Ltd., Japan

[21] Appl. No.: 842,331

[22] Filed: Oct. 14, 1977

Related U.S. Application Data

[63] Continuation of Ser. No. 661,010, Feb. 24, 1976, abandoned.

[30] Foreign Application Priority Data

Mar. 11, 1975 [JP] Japan .................. 50-028617
Mar. 11, 1975 [JP] Japan .................. 50-028618

[51] Int. Cl.² ............................ F01L 3/00; F01L 1/32
[52] U.S. Cl. .................... 123/188 AF; 123/90.28; 123/188 M; 123/188 VA; 123/141
[58] Field of Search ............... 123/188 AF, 188 VA, 123/188 M, 90.28, 90.29, 141

[56] References Cited

U.S. PATENT DOCUMENTS

| | | | |
|---|---|---|---|
| 1,111,545 | 7/1914 | Mahony | 123/90.28 |
| 1,418,911 | 6/1922 | Garlick | 123/188 VA |
| 1,503,417 | 7/1924 | Gilbert | 123/90.28 |
| 1,552,760 | 9/1925 | Rothenbucher | 123/90.28 |
| 1,812,262 | 6/1931 | Gardner et al. | 123/188 VA |
| 2,866,187 | 1/1959 | Meurer | 123/188 VA |
| 2,920,613 | 1/1960 | Vogel et al. | 123/188 M |
| 2,921,571 | 1/1960 | Vogel et al. | 123/188 M |
| 2,988,080 | 6/1961 | Rankl | 123/188 VA |
| 3,090,370 | 5/1963 | Kimball | 123/188 VA |
| 3,154,059 | 10/1964 | Witzky et al. | 123/188 M |

Primary Examiner—Charles J. Myhre
Assistant Examiner—David D. Reynolds

[57] ABSTRACT

An air intake system for an internal combustion engine, particularly for a diesel engine containing a cylinder having a combustion chamber therein, is disclosed. The system comprises a spiral-shaped intake port formed in the cylinder head. The spiral-shaped intake port introduces intake air into the combustion chamber and compulsorily produces a swirling motion of the intake air while the air passes through the intake port. The system further comprises a baffle or baffles for attenuating the swirling motion of the intake air to an optimum level prior to the intake air being sucked into the combustion chamber.

7 Claims, 11 Drawing Figures

AIR INTAKE SYSTEM FOR AN INTERNAL COMBUSTION ENGINE

This is a continuation, of application Ser. No. 661,010, filed Feb. 24, 1976, now abandoned.

BACKGROUND OF THE INVENTION

The present invention relates to an air intake system for an internal combustion engine and more particularly relates to an air intake system adapted for use in generating an adequate swirling motion of intake air introduced into combustion chambers of a direct injection-type diesel engine.

It is known that in a direct injection-type diesel engine, generating a swirling motion of intake air about the cylinder axis when the intake air is introduced into the combustion chamber of the cylinder is extremely effective for obtaining a well blended mixture of the intake air and fuel within the combustion chamber and thereby causing complete combustion of the mixture.

It is also known that the intensity of the swirling motion of the intake air must be regulated so as to be suited for a given shape of the combustion chamber and for a specific type of fuel injection system employed in the diesel engine. Further, the intensity regulation of the swirling motion must be performed without decrease in weight flow of the intake air flowing into the combustion chamber, so that increases in output power and combustion efficiency of the diesel engine is achieved. Thus, there have already been proposed diverse types of methods for regulating the intensity of the swirling motion during suction of the intake air into a diesel engine. However, these diverse methods can be classified by the following two types. That is, in the first method, an air intake passageway is sloped so that the intake air is admitted into a cylinder in the tangential direction of the cylinder bore. In this sloping air intake passageway, a desired swirling motion of the intake air is produced by selecting the sloping angle in relation to the axis of the cylinder and by selecting the angle of the passageway in relation to the tangential direction of the cylinder bore. Thus, it can be appreciated that in the above first type method, the regulation of the intensity of the swirling mothin is considerably easy. However, there is such a disadvantage that when production of a strong swirling motion is required, it is impossible to prevent a decrease in the amount of intake air flowing into the combustion chamber. Further, uniformity in production of the sloping air intake passageway is so sensitive, that the slightest change affects the intensity of the swirling motion. Consequently, in the case of a multi-cylinder engine, such change in production uniformity often makes it difficult to acquire optimum combustion of the air fuel mixture in each cylinder of the multi-cylinder engine.

In the second type method, the air intake passage is formed into a spiral shape so that the swirling motion of the intake air is induced while passing along the spiral-shaped air intake passageway. In the spiral-shaped air intake passageway, a stable swirling motion can surely be obtained. However, since the swirling motion of the intake air is compulsorily produced by the spiral-shaped passageway, the swirling motion becomes relatively strong and further, a control for attenuating the strong swirling-motion to an appropriate level is very difficult. Furthermore, if the intensity of the swirling motion of intake air is set to be appropriate at a medium engine speed, in the range of engine speed other than medium engine speed, the intensity of the swirling motion can not be appropriate. That is, at a high engine speed range, the swirling motion is very strong, while at a low engine speed range, the swirling motion is very weak. Consequently, in these two engine speed ranges, diffusion of the atomized fuel within the combustion chamber and mixing of the atomized fuel with the intake air are not suitable for causing good combustion within the combustion chamber.

In order to eliminate the disadvantages of the above-mentioned two types of methods, a further conventional method comprising a combination of the sloping intake air passageway and the spiral-shaped intake air passageway has been developed. In this conventional method, the intake valve is devised so that an arcuate-shaped masking plate is provided on one side of the intake valve so as to circumferentially extend along the margin of this one side. Thus, the intake air is admitted into the combustion chamber only around a part of the periphery of the intake valve and in the desired direction causing the swirling motion of the intake air. In this case, the intensity of the swirling motion of the intake air can be regulated by adjusting the position of the masking plate with respect to the air intake passageway during diesel engine assembly. However, provision of the arcuate masking plate on the one side of the intake valve results in the fact that effective passage of the intake air around the intake valve is restricted thereby causing a disadvantageously large decrease in the amount of intake air. Therefore, this latter conventional method could not be a complete method from the point of view of acquiring an increase in diesel engine power, enhancement of the combustion efficiency of the diesel engine and a reduction in harmful exhaust emissions from the diesel engine.

SUMMARY OF THE INVENTION

It is, therefore, an object of the present invention to provide a novel air intake system for an internal combustion engine which completely eliminates the above-mentioned disadvantages of the conventional methods for regulating the swirling motion of the intake air.

Another object of the present invention is to provide a novel air intake system for an internal combustion engine in which system the intensity regulation of the swirling intake air motion is performed so that the strong swirling motion produced in an intake port of each cylinder of the internal combustion engine is attenuated to a suitable level for causing good diffusion of a fuel charge and efficient mixing of the fuel charge with the intake air.

A further object of the present invention is to provide an air intake system for an internal combustion engine in which system the swirling motion of the intake air is controlled so that the intensity of the swirling motion is adjusted in response to change in the engine speed thereby maintaining the optimum combustion of the air-fuel mixture over a wide engine speed range.

In accordance with the present invention, there is provided an air intake system for an internal combustion engine including at least a cylinder having therein a combustion chamber, which system comprises: a cylinder head mounted on the cylinder and having therein a spiral-shaped intake port capable of communicating with the combustion chamber for introducing intake air into the combustion chamber, the spiralshaped intake port producing a swirling flow of the intake air while the intake air passes along the intake port and; baffle means for attenuating the motion of the swirling intake air flow prior to introduction of the intake air into the combustion chamber. The baffle means are arranged at a portion of the intake port adjacent to the combustion chamber.

BRIEF DESCRIPTION OF THE DRAWING

Other objects and advantages of the present invention will become apparent from the ensuing description of embodiments with reference to the accompanying drawings in which.

In the above drawings, like numerals refer to like or corresponding parts throughout.

DETAILED DESCRIPTION OF THE PREFERRED EMBODIMENT

Figure 1:
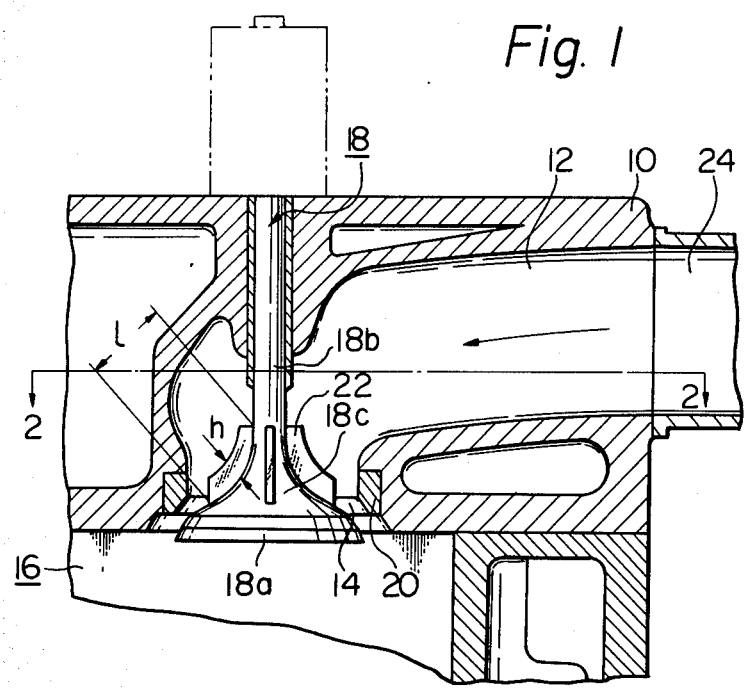
FIG. 1 is a fragmentary vertical sectional view of an air intake system according to an embodiment of the present invention.
Figure 2:
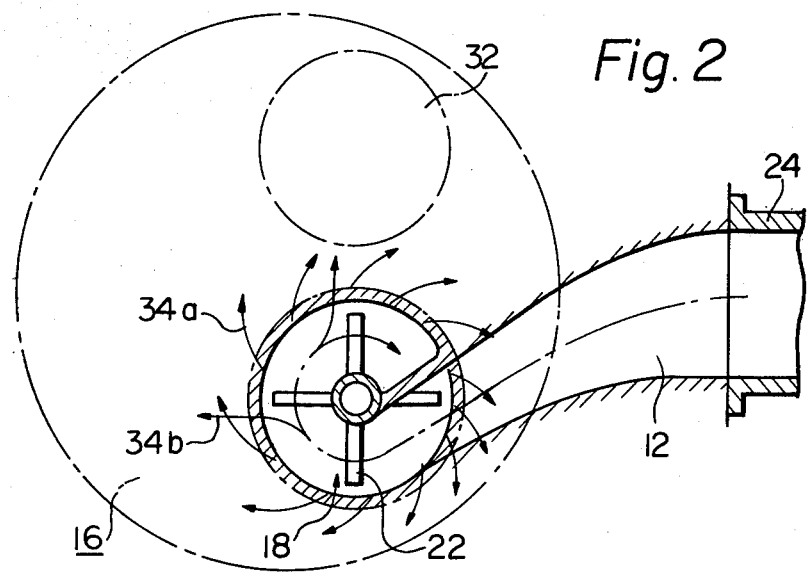
FIG. 2 is a cross-sectional view taken along the line 2—2 of FIG. 1.

Referring now to FIGS. 1 and 2, which indicate an essential portion of a water cooling direct-injection-type diesel engine employing an air intake system according to an embodiment of the present invention, a cylinder head 10 is formed therein with an intake port 12, an outer end of which is connected to an air intake manifold 24 adapted for suction of atomospheric air. The opposite inner end of the intake port 12 opens into a combustion chamber 16 of the engine cylinder so that communication is provided between the port 12 and combustion chamber 16. To the inner end of the intake port 12, a valve seat 20 is fixed so as to cooperate with an intake valve 18 which operates to open and close the inner end of the intake port 12. The intake port 12, extending from its outer to inner end, is formed into a spiral shape so that a swirling motion of the sucked-in air (described later) is induced while the air passes along the spiral-shaped intake port 12. The intake valve 18, movable in the vertical direction of FIG. 1, is comprised of a valve head 18a, a valve stem 18b and a valve land 18c connected between the valve head and valve stem. The valve land 18c has a flaring configuration, as is clearly shown in FIG. 1, and is provided with four equiangularly arranged baffles 22 fixed on the surface of the valve land 18c. The baffles 22 may be formed to be integral with the valve land 18c, if desired. Each baffle 22 radially projects from the valve land 18c into the intake port 12 and has a surface area suitable for resisting the swirling motion of the air when the air impinges upon each baffle. It should be understood that the atmospheric air supplied by the air intake manifold 24 flows into the intake port 12 of the cylinder head 10, subsequently passes along the intake port 12 and is finally sucked into the combustion chamber 16 through an annular opening 14 when the intake valve 18 opens. Numeral 32 of FIG. 2 designates an exhaust valve. As is understood from FIG. 2, the atmospheric air flowing into the intake port 12 is guided by the intake port 12 so as to spirally turn in the clockwise direction as shown in FIG. 2, since the intake port 12 has a spiral shape. That is to say, the clockwise swirling flow of the sucked-in air is compulsorily produced while passing along the intake port 12. When the swirling air flow reaches the valve land 18c of the intake valve 18, a portion of the swirling air flow is admitted into the combustion chamber 16 through the opening 14 while maintaining the spiral clockwise swirling motion as shown by flow lines 34a in FIG. 2.

When a portion of the swirling air flow is admitted into the combustion chamber 16, the air is diffused into the wide space of the combustion chamber 16 and the remaining portion of the swirling air flow, which has reached the valve land 18c, impinges upon the baffles 22 and thus, the remaining portion of the swirling air flow is deflected thereby to advance same in the radial direction of the axis of the intake valve 18 as shown by the flow lines 34b. When the air impinges upon the baffles 22, the swirling motion thereof is attenuated. The attenuation of the air swirling motion also occurs when the above-mentioned two swirling flows of air, designated by the flow lines 34a and 34b, collide with one another around the valve head 18a. Thus, the strong swirling motion of the intake air compulsorily produced by the spiral-shaped intake port 12 can be attenuated, to some extent, suitable for more efficient mixing of the intake air and fuel and for causing complete combustion of the air-fuel mixture. It should be understood that the extent of attenuation of the swirling motion can be adjusted by appropriately changing the length "l" and the height "h" of each baffle 22 (refer to FIG. 1) and by appropriately selecting the number of baffles 22. That is, increase in the length "l" and the height "h" of each baffle 22 or increase in the number of baffles 22, up to a specifically selected number, causes increase in the extent of attenuation of the number, causes increase in the extent of attenuation of the air swirling motion.

Figure 3:
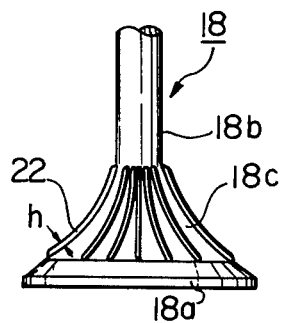
FIG. 3 is a fragmentary front view of a modification of the intake valve adapted for use in the system of FIG. 1.

FIG. 3 indicates a modification of the intake valve 18 used for the air intake system of FIGS. 1 and 2. In the intake valve 18 of FIG. 3, the height "h" of each baffle 22 is considerably lowered compared with that of each baffle 22 of FIG. 1. However, the number of baffles 22 of FIG. 3 are fully increased so that the same attenuation operation as in the case of FIG. 1 is effected by all of the baffles 22 of FIG. 3. In this connection, adoption of a large number of baffles brings about such an advantage as described hereinbelow. When the strong swirling air flow impinges upon baffles 22, the intake valve 18 causes a turning motion about the axis thereof, if measures for stopping the turning motion of the intake valve 18 is adopted. Further, in the case of the intake valve 18 having a small number of baffles 22, the relative position of the intake valve 18 to the intake port 12 must change as the intake valve 18 turns about the axis thereof. Therefore, the attenuation effect of the air swirling motion exerted by baffles 22 varies and becomes unstable in response to the change in the relative position of the intake valve 18 to the intake port 12. It should, therefore by understood that the adoption of the above-mentioned measures for stopping the turning motion is indispensable for the intake valve 18 having a small number of baffles 22. On the other hand, in the case of the intake valve 18 having a large number of baffles, the change in the relative position of the intake valve 18 to the intake port 12 causes no appreciable change in the attenuation effect exhibited by the baffles 22, since the number of baffles 22 which confront the swirling flow of the incoming air is always constantly maintained regardless of the change in the relative position of the intake valve 18 to the intake port 12. Therefore, no measures for stopping the turning motion of the intake valve 18 is required if intake valve 18 has a large number of baffles 22. In addition, it should be noted that if the turning motion of the intake valve 18 is permitted, this turning motion can advantageously contribute to preventing local wear of the intake valve 18 and the valve seat 20. Further, it should be appreciated that if a number of the same baffles as those of FIG. 3 are provided for the exhaust valve 32 shown in FIG. 2, prevention of local wear of the exhaust valve 32 and its cooperating valve seat will similarly be achieved so that longevity of the diesel engine may be ensured.

In the intake valve 18 shown in FIGS. 1 and 2 or in the modification shown in FIG. 3, baffles 22 are disposed so as to project from the valve land 18c in the radial direction with respect to the axis of the valve 18. Thus, no restriction of the effective area for passing the air is caused around the valve head 18a. Therefore, weight flow reduction of the intake air admitted into the combustion chamber 16 through the annular opening 14 does not occur. If the weight flow reduction of the intake air does not occur, the disposition of the baffles 22 may be varied from those shown in FIGS. 1 through 3.

Figure 4A:
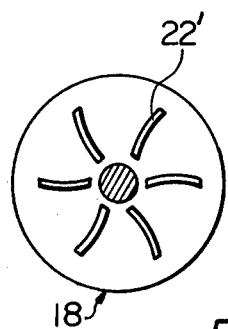
FIGS. 4A and 4B are partially-sectional plan views of other modifications of the intake valve adapted for use in the system of FIG. 1.
Figure 4B:
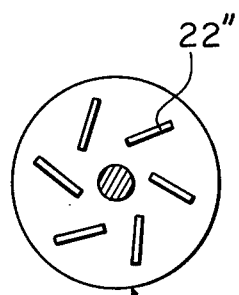

FIG. 4A indicates another modification of the intake valve 18 in which each baffle 22' is fixed to the surface of the valve land 18c and is formed as a curved plate extending in a substantially radial direction but being deflected from the center of the round valve head 18a. FIG. 4B indicates a further modification of the intake valve 18 in which each baffle 22'', fixed on the surface of the valve land 18c, is formed as a flat plate which is disposed so as to further be deflected from the center of the valve head 18a compared with the valve 18 shown in FIG. 4A. The baffles 22' and 22'', of course, operate similarly to the baffles 22 shown in FIGS. 1 through 3.

Figure 5:
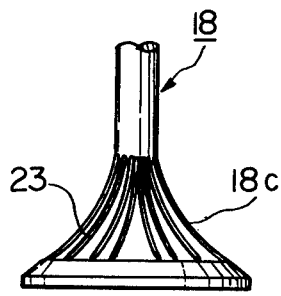
FIG. 5 is a fragmentary front view of a further modification of the intake valve used in the system of FIG. 1.

FIG. 5 indicates a still further modification of the intake valve 18 in which a plurality of baffles 23 comprises grooves formed in the surface of the valve land 18c. The grooves extend in the precise radial direction, and each groove has appropriate radial length and depth. The groove-shaped baffles 23 operate in the same manner as the projecting plate-shaped baffles 22, 22' and 22'' heretofore described with reference to FIGS. 1 through 4B. That is, the baffles 23 operate to appropriately attenuate the strong swirling motion of the intake air when the air inpinges upon the grooved baffles without causing decrease in the weight flow of the intake air admitted into the combustion chamber 16.

The foregoing description is directed to cases where the baffles are provided on the valve land 18c of the intake valve 18. However, it will be readily understood that the attenuation of the compulsorily produced swirling motion of the intake air can equally be achieved by providing a selected number of baffles on the surface of the valve stem 18b of the intake valve 18 or by providing baffles on the inner wall of the intake port 12 adjacent to the intake valve 18.

From the foregoing, it will be obvious to one skilled in the art that the air intake system according to the embodiment of FIGS. 1 and 2, can surely provide an optimum swirling motion of the intake air for diesel engines by pre-designing the shape, the size, the number and other factors of the baffles and as a result, increase in output power and combustion efficiency of the diesel engine as well as decrease in emission of harmful components from the engine are acquired with certainty.

Figure 6:
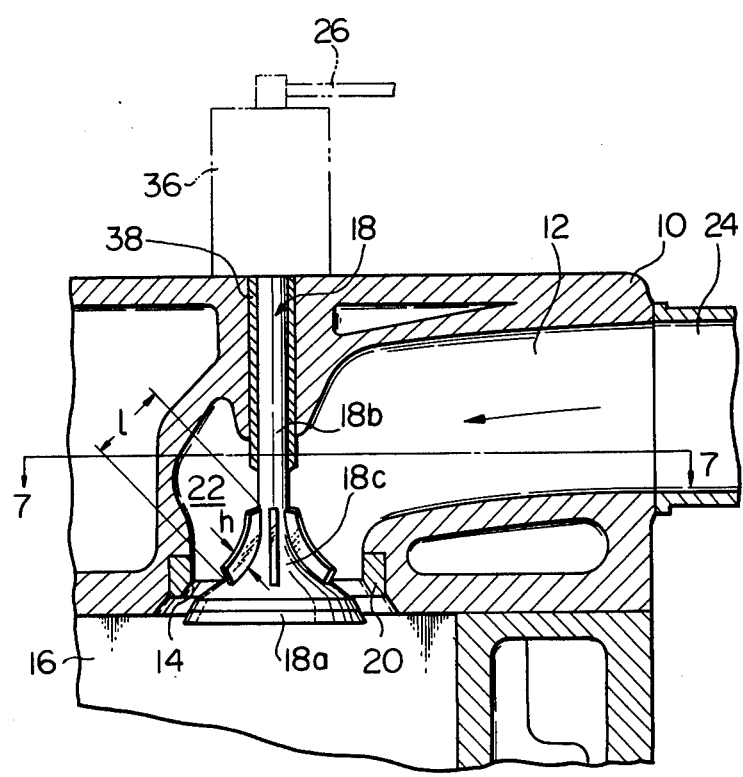
FIG. 6 is a fragmentary vertical-sectional view of an air intake system according to another embodiment of the present invention.
Figure 7:
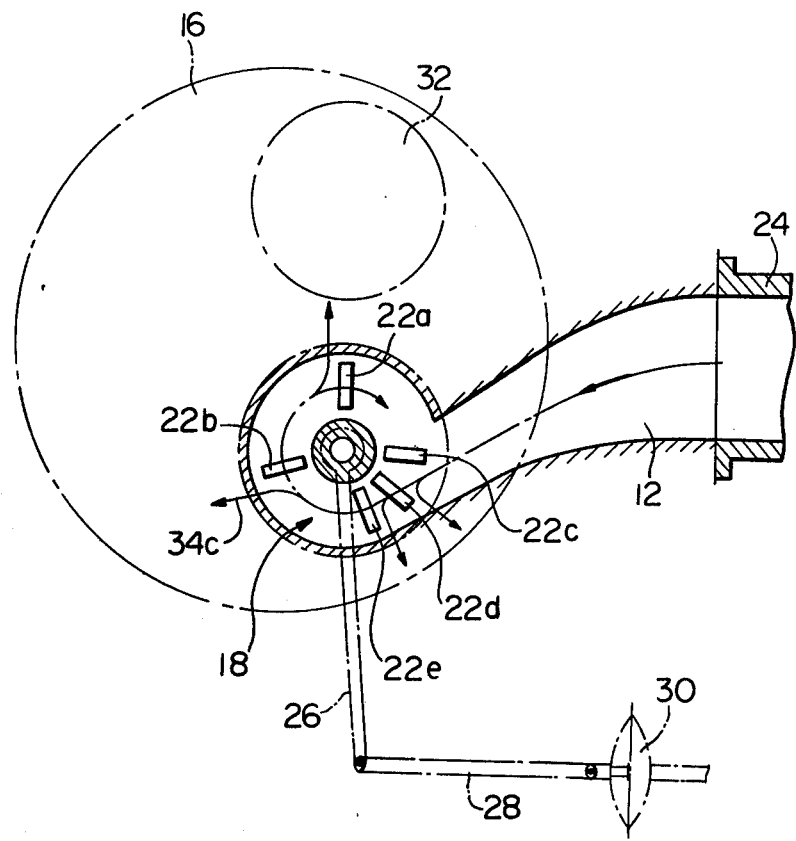
FIG. 7 is a cross-sectional view taken along the line 7—7 of FIG. 6.

The second embodiment of the present invention will be described with reference to FIGS. 6 and 7. The air intake system of the second embodiment shown in FIGS. 6 and 7 comprises a cylinder head 10 formed therein with a spiral-shaped intake port 12. The outermost end of the intake port 12 is connected to an air manifold 24, and the innermost end of the intake port 12 opens toward a combustion chamber 16. At the innermost end of the intake port 12, an intake valve mechanism comprising an intake valve 18 and a valve seat 20 is provided. The intake valve 18 is comprised of a valve head 18a, a valve stem 18b, a valve land 18c and a spring 36 urges the valve head 18a against the valve seat 20 so as to close the innermost end of the intake port 12. When the intake valve 18 is moved by a suitable cam mechanism (not shown) in the downward direction of FIG. 6 against the force of the spring 36, an annular opening 14 is provided between the valve head 18a and the valve seat 20. The valve land 18c is provided with five baffles 22 fixed on the surface of the valve land 18c. Each baffle 22 has the shape of an elongated wall projecting in a radial direction about the axis of the valve 18, respectively. The baffles 22, however, are arranged at unequal spaces therebetween in the circumferential direction about the axis of the valve 18, as shown in FIG. 7. That is, the spaces between baffles 22c and 22d and between 22d and 22e are narrow, while in contrast, the spaces between 22e and 22b, between 22b and 22a and between 22a and 22c are wide. The valve stem 18b extending upward through the cylinder head 10 is provided with a lateral arm 26 fixed on the outermost end of the valve stem 18b. It should be noted that the valve stem 18b is rotatably held in the cylinder head 10 by means of valve guide 38 shown in FIG. 6. The arm 26, extending laterally, is connected to one end of a link 28 and the other end of the link 28 is connected to an intake valve position controller 30. The position controller 30 operates so as to detect a change in the engine speed and to automatically control the position of the valve 18 in response to any change in the engine speed. The detection of any change in the engine speed may be performed e.g. by detecting a change in the intake manifold vacuum. A conventional speed governor may also be used as the position controller 30, if desired.

The intake air supplied from the intake manifold 24 flows into the intake port 12 of the cylinder head 10 and is then sucked into the combustion chamber 16 via opening 14. While passing through the spiral-shaped intake port 12, the intake air is furnished with a strong swirling motion in the clockwise direction as shown in FIG. 2. A portion of the swirling intake air flow impinges upon the baffles 22 of the valve land 18c prior to entering the combustion chamber 16. Thus, the impinged swirling intake air flow changes its advancing direction to the directions shown by flow lines 34c in FIG. 7. That is, baffles 22 direct the incoming swirling intake air flow towards the radial direction about the axis of the valve 18. Also, the baffles 22 operate so as to attenuate the strong swirling motion of the intake air immediately before the intake air is sucked into the combustion chamber 16. At this time, the swirling motion of the intake air becomes weaker as the number of baffles 22, upon which the incoming swirling air flow initially impinges, becomes larger. In other words, the extent of attenuation of the swirling motion is proportionally increased in response to increase in the number of baffles 22 upon which the incoming swirling intake air flow initially impinges when the incoming swirling flow reaches the intake valve 18.

Figure 8A:
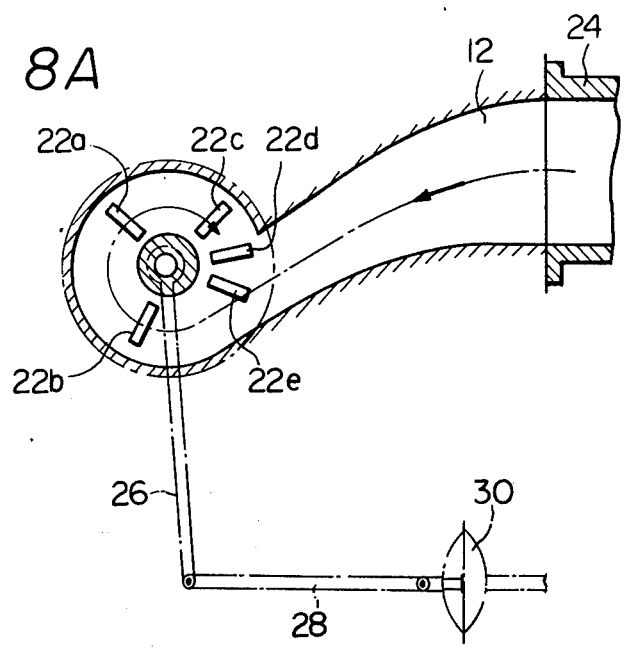
FIGS. 8A through 8C are the same cross-sectional views, on a reduced scale, as FIG. 7, which explain the operation of the system of FIG. 6.
Figure 8B:
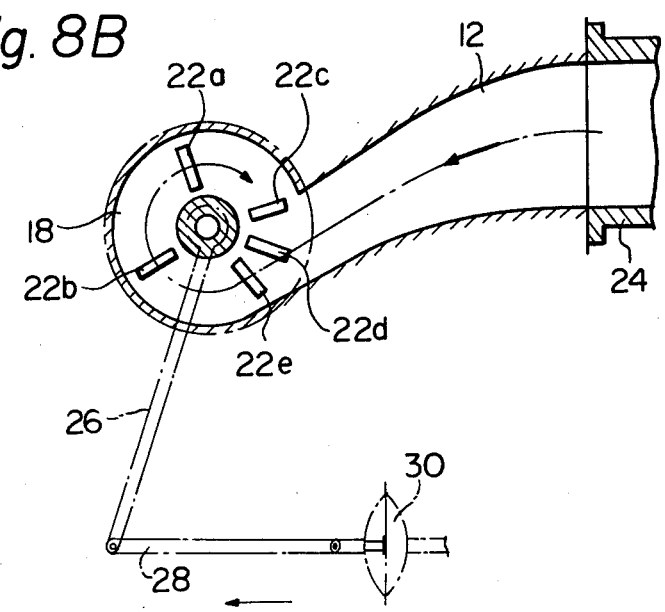
Figure 8C:
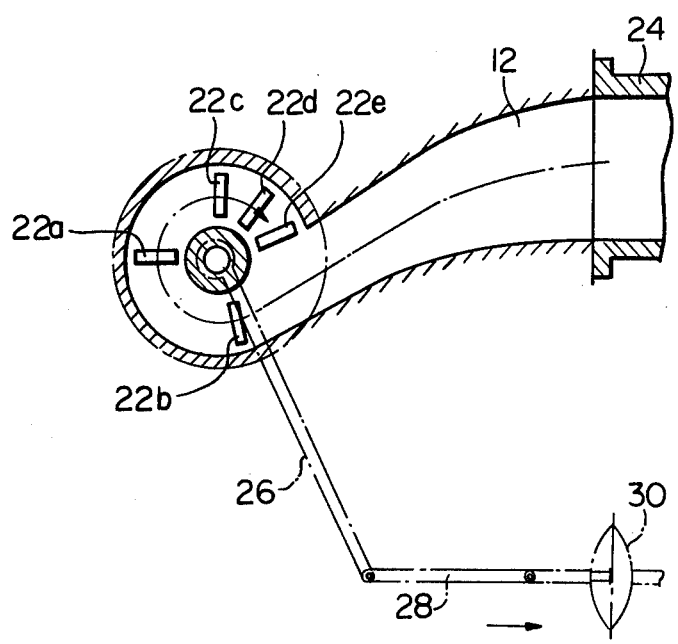

The operation of the air intake system according to the above-described second embodiment will be explained with reference to FIGS. 8A through 8C.

The relative position of the baffles 22 of the intake valve 18 to the intake port 12 is first determined so that the optimum intensity of the swirling motion is obtained at medium engine speed. That is to say, as shown in FIG. 8A, the position controller 30 is adjusted at medium engine speed so that when the swirling intake air flow travelling along the center of the intake port 12 reaches the valve 18, the swirling flow impinges upon the baffle 22e. Further, the size or the dimensions "l" and "h" (Refer to FIG. 6) of the baffle 22e must be selected in such a manner that the swirling motion is attenuated so as to become optimum for causing complete diffusion of the atomized fuel and complete mixing of the fuel with the intake air within the combustion chamber 16. As the engine speed increases, the swirling motion of the intake air becomes stronger due to the strong suction of the engine. Therefore, the optimum diffusion of the atomized fuel and thus, the optimum mixing of the fuel with the intake air fails, if the strong swirling flow of the intake air is directly introduced into the combustion chamber 16. For preventing such failure, the position controller 30 detects increase in the engine speed and moves the link 28 in the arrow direction shown in FIG. 8B and as a result, the intake valve 18 is rotated about its axis in the clockwise direction shown in FIG. 8B via arm 26 until the baffle 22d comes to the position whereat the baffle 22e was previously stationed. Thus, as understood from FIG. 8B, when the engine speed increases gradually to a very higher level, the incoming swirling intake air flow coming from the intake port 12 impinges upon three baffles 22c, 22d, and 22e. As a result, the swirling motion of the intake air, which is stronger than that in the case of medium engine speed, is again appropriately attenuated. At a transient engine speed between medium and high engine speeds, the position of the intake valve 18 about its axis is adjusted by the position controller 30 so that some of the baffles 22c through 22e operate so as to appropriately attenuate the swirling motion of the intake air.

In the case where the engine speed is low, the intensity of the swirling motion of the intake air produced in the spiral-shaped intake port 12 is relatively weak. Thus, if such a weak swirling intake air flow is further attenuated prior to entering the combustion chamber 16, sufficient diffusion of the atomized fuel for attaining complete combustion of the air-fuel mixture must, inevitably fail. To avoid such failure, the position controller 30 detects decrease in the engine and moves the link 28 and the arm 26 in the arrow direction of FIG. 8C thereby causing the counter-clockwise rotation of the intake valve 18. As a result, the impingement of the incoming swirling intake air flow upon the three baffles 22c through 22e is prevented. Consequently, a sudden attenuation of the swirling motion of the intake air can be avoided. Therefore, at low engine speed, the swirling intake air flow which is introduced into the combustion chamber 16 can still be optimum for causing completely diffusion of the atomized fuel and complete mixing of the fuel with the intake air. Naturally, at a transient engine speed between medium and low gine speeds, the position controller 30 controls the position of the intake valve 18 between the two positions shown in FIGS. 8B and 8C.

In the second embodiment, five unequiangularly arranged baffles 22 are provided on the surface of the valve land 18c of the intake valve 18. However, various modifications of baffle arrangement may be made. For example, the number of baffles may be larger or smaller. If a small number of baffles is used, the change in the position of the intake valve 18 about its axis will sharply affect the extent of attenuation of the swirling motion of the intake air. Further, the length "l" and the height "h" of each baffle 22 should be determined so that the optimum performance of the diesel engine is acquired. Naturally, the arrangements and shapes of the baffles which are described with reference to FIG. 3 through 5 may be adopted for the air intake system according to the second embodiment.

From the foregoing description of the second embodiment, it will be understood that in accordance with the present invention, the swirling motion of the air, which becomes stronger in response to the increase in engine speed, can be controlled in response to this increase in engine speed so that the optimum swirling intake air flow for causing stable and complete combustion of the air-fuel mixture is introduced into the combustion chamber of the diesel engine cylinder. As a result, reduction of harmful emissions from the diesel engine is achieved without engine performance deterioration.

While the described embodiments represent preferred forms of the present invention, it is to be understood that any further modifications will occur to those skilled in the art without departing from the spirit of the present invention. The scope of the present invention is therefore to be determined solely by the appended claims.

What is claimed is:

1. An air intake system for an internal combustion engine including at least a cylinder head therein, a combustion chamber, comprising:

a cylinder head mounted on said cylinder and having therein a spiral-shaped intake port capable of communicating with said combustion chamber for introducing an intake air into said combustion chamber, said spiral-shaped intake port producing a swirling flow of said intake air while said intake air passes along said intake port;

an intake valve rotatably mounted in said cylinder head for opening and closing between said intake port and said combustion chamber;

at least a baffle provided on a portion of said intake valve which is exposed to said intake port, said baffle being arranged so as to resist said swirling intake air flow when said incoming intake air reaches and impinges upon said intake valve thereby attenuating the motion of said swirling intake air flow; and means for rotating said intake valve about the axis thereof in response to change in the speed of said internal combustion engine thereby controlling relative position of said baffle to said swirling intake air flow.

2. An air intake system as set forth in claim 1, wherein said rotating means comprises an arm having an end connected to said intake valve and a position controller connected to the other end of said arm for turning said arm about the axis of said intake valve, said position controller detecting change in said speed of said internal combustion engine.

3. An air intake system as set forth in claim 2, wherein said intake valve includes a valve head provided with an annular opening there around for introduction of said intake air when said intake valve is opened, a valve land formed on the surface of said valve head which is exposed to said intake port, a valve guide fixedly mounted on said cylinder head, and a valve stem extending vertically from said valve land through said valve guide, said valve stem having one outermost end connected to said arm of said rotating means.

4. An air intake system as set forth in claim 1, wherein said baffle provided on said intake valve is a projection arranged so that said swirling intake air flow impinges thereupon immediately prior to being introduced into said combustion chamber.

5. An air intake system as set forth in claim 1, wherein said portion of said intake valve which is exposed to said intake port is formed thereon with a plurality of baffles, and wherein said rotating means operating to change the number of said baffles exposed to said intake port so as to resist said swirling intake air in response to said change in the speed of said internal combustion engine.

6. An air intake system as set forth in claim 1, wherein said system further comprises a spring means for positioning said intake valve to a predetermined position of said intake valve during the stopping of said air intake system.

7. An air intake system as set forth in claim 1, wherein said internal combustion engine is a direct injectiontype diesel engine.

* * * * *